July 1, 1952  J. SKOPIC  2,601,995
FLUID PRESSURE SEALING MEANS
Filed Oct. 1, 1945
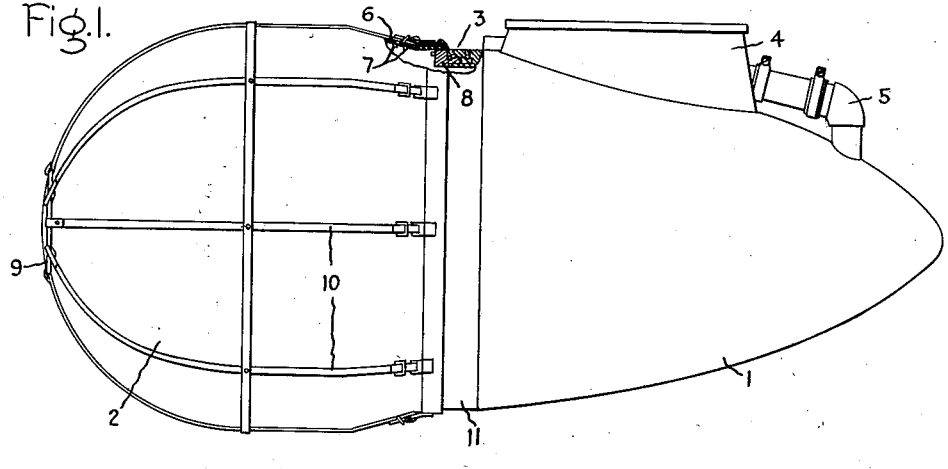
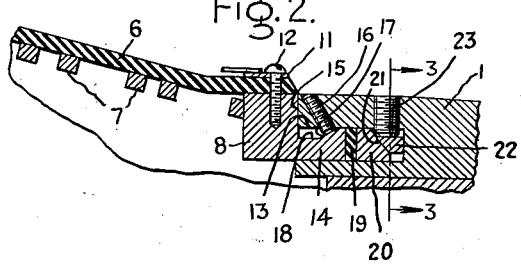
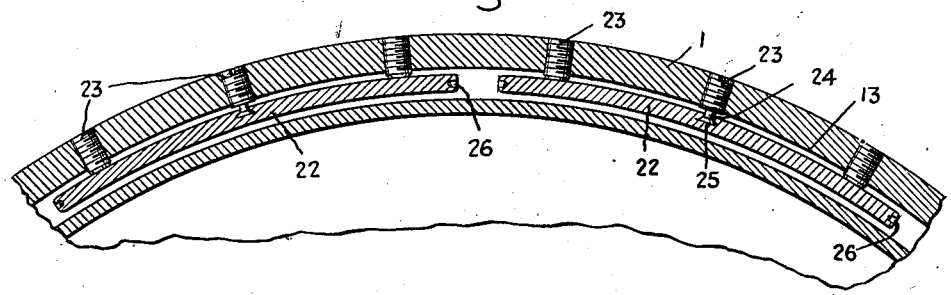
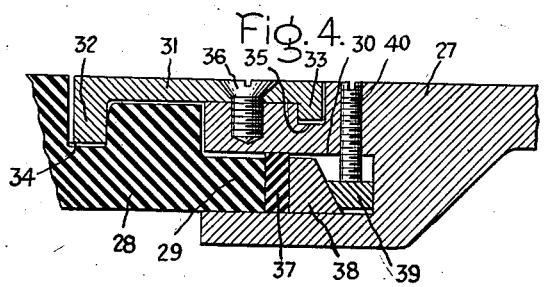
Inventor:
John Skopic,
by Merton D Morse
His Attorney.

Patented July 1, 1952

2,601,995

UNITED STATES PATENT OFFICE 2,601,995

FLUID PRESSURE SEALING MEANS

John Skopic, Schenectady, N. Y., assignor to General Electric Company, a corporation of New York Application October 1, 1945, Serial No. 619,644

8 Claims. (Cl. 285—163)

This invention relates to fluid-tight seals for preventing leakage between adjacent wall members and particularly to such seals for preventing leakage of fluid between separable walls of closed casings or housing and which seals are readily detachable.

Many types of apparatus require closed casings or housing having removable wall portions for the purpose of inspection or servicing of the apparatus therein. For example, in one form of supersonic underwater signaling apparatus an electroacoustic transducer is arranged within a streamlined housing carried under water on a vessel. The front portion or nose of the housing is constructed of a sound transmitting material, such as rubber, and must be made removable in order to gain access to the equipment within the housing. Furthermore, it is essential that a fluid-tight seal be provided between the nose piece and the body of the housing and that the seal be readily removable by operation of devices accessible from the exterior of the housing. Furthermore, on a streamlined housing of this type it is desirable that all projections on the external surface be as small as possible to minimize resistance to the passage of the housing through water. It is therefore desirable that the devices for actuating the sealing mechanism shall not project appreciably beyond the surface of the housing. Accordingly, it is an object of this invention to provide a fluid-tight seal for enclosures having separable wall sections including an improved arrangement for insuring a fluid-tight seal and which shall be easily detachable for opening of the enclosure.

It is another object of this invention to provide a simple and effective detachable sealing device for closed housings which shall present minimum resistance to the passage of fluid over the outside of the housing.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which Fig. 1 represents a closed housing employing a detachable sealing device embodying the invention; Fig. 2 is an enlarged sectional view of the sealing device shown in Fig. 1; Fig. 3 is a sectional view on the line 3—3 of Fig. 2; and Fig. 4 is a view similar to Fig. 2 of another embodiment of the invention.

Referring now to the drawing, the closed housing illustrated in Fig. 1 is of streamlined or teardrop design of round cross section and suitable for use under water for enclosing apparatus such as a supersonic signaling device. The housing comprises a main or body portion 1 and a nose portion 2 secured together about their open ends by a detachable sealing device 3 embodying the invention. The housing 1 is arranged to be attached to a suitable vessel through a supporting boss 4 and air or other fluid under pressure may be admitted to the interior of the housing from the vessel through a connection 5 between the interior of the boss 4 and the housing. The nose 2 comprises a dome-shaped wall constructed of rubber or other suitable sound transmitting material indicated in cross section at 6 and supported on a metal grid or framework a portion of which is shown in section at 7 in Figs. 1 and 2. The metal grid 7 is rigidly secured to a ring 8 forming the periphery or rim of the nose piece 2, and the rubber wall 6 is vulcanized or otherwise suitably sealed to the ring 8. The rubber wall 6 may also be held against the gridwork 7 by a suitable harness 9 having straps 10 attached to a band 11 and secured to the ring 8 by screws 12. The harness 9 holds the rubber wall member 6 against the gridwork and prevents undue distortion of the wall due to pressure within the housing, this pressure normally being higher than the external pressure for the purpose of minimizing leakage into the housing.

A detachable seal between the housings 1 and 2 extends entirely around the housings and prevents leakage on all sides. The seal is constructed by providing a recess in the form of a slot or groove 13 extending entirely around the rim of the housing 1 and facing forward toward the nose piece 2. A tongue 14 is formed on the rim 8 of the nose piece and is arranged to fit the slot and to extend into the slot until the outer portion of the ring 8 acting as a stop strikes the housing 1 along its outer abutting surface 15. Removal of the tongue from the slot is prevented by tightening of a plurality of screws 16 threaded into the nose piece 2 on the outer side of the slot at an angle positioned to engage a sloping surface 17 formed on the forward side of the tongue 14 which has a reduced portion 18 between the surface 17 and the body of the rim 8. When the screws 16 have been tightened the nosepiece 2 is rigidly held on the housing 1. The screws 16 are made to lie substantially flush with the outer surface of the casing 1 when they have been tightened. In order to provide a seal between the end of the tongue 14 and the sides of the casing 1 within the slot 13 an annular gasket 19 of deformable or resilient material is placed in the slot adjacent the tongue 14, and in order to compress the gasket 19 and force it into sealing engagement with both the wall of the casing 1 and the tongue member 14 an annular wedging ring 20 is located adjacent the gasket 19 and is provided with a sloping surface 21 along which are arranged a plurality of wedging elements or segments 22 two of which are illustrated in Fig. 3. The wedges 22 may be forced inwardly by operation of a plurality of screws 23 so that pressure is exerted between the end wall of the slot 13 and the pressure distributing ring 20 to force the gasket 19 into sealing engagement with the tongue and with the sides of the slot 13. When the screws 23 are tightened in position to provide the liquid-tight seal, their heads lie substantially flush with the outer wall of the casing 1 and present minimum resistance to the flow of liquid over the outside of the housing. As shown in Fig. 1, each of the segments 22 is in engagement with three of the screws 23 so that pressure may be exerted substantially equally over the length of each segment. When it is desired to loosen the segments the outer two screws 23 on each segment may be loosened first and thereafter the middle screw may be retracted so that it draws the segment 22 outwardly; for this purpose the middle screw is formed with a terminal member 24 dovetailed in a slot 25 in the middle of the segment 22 so that the segment is pulled outwardly on retraction of the middle screw 23. The slot 25 extends across the segment 22 so that when the segment 22 is removed from the slot 13 it will be disengaged from the terminal member 24 of the middle screw 23. In order to remove the segments 22 and also to place them in the slot in the desired position, each segment is provided with recesses 26 at its ends. These recesses may be engaged by projections on a suitable tool (not shown) or by separate tools provided to engage the recesses at each end of the segment so that the segments may easily be located in their desired positions.

When the seal is being assembled the screws 23 are placed in their retracted positions and the plurality of segments 22 are then inserted in the slot 13 around its entire circumference. The pressure distributing ring 20 is placed in the slot with its sloping surface 21 in engagement with the sloping edge of the elements 22 and the gasket ring 19 is then inserted and pressed against the ring 20. The seal is now ready for the nose piece 2 to be placed in position and the tongue 14 is inserted in the slot 13. The screws 16 being in their retracted positions are then tightened uniformly about the periphery of the casing and press the tongue 14 into position so that the ring 8 rests on the housing 1 along the surface 15. When the screws 16 have been tightened the nose piece 2 is rigidly held on the casing 1. A fluid-tight seal is then effected by tightening the screws 23 uniformly around the periphery of the casing to press the wedging elements 22 inwardly and force the pressure distributing ring 20 along the slot 13 against the gasket 19 thereby forcing the gasket into fluid-tight sealing engagement with the rim of the housing 1 and the nose piece 2. It is thus apparent that the sealing device provides a simple and effective arrangement for providing a fluid-tight seal between two removable wall portions of the closed housing while presenting minimum interference with the smooth external surface of the housing. Furthermore, the sealing gasket is completely protected from injury which might be caused by contact with external objects during movement of the casing, through water for example.

In Fig. 4 there is illustrated a modified embodiment of the invention which is particularly intended for sealing a casing of rigid material such as a plastic to a steel casing or housing, such as the housing 1 in Fig. 1. In Fig. 4 the rim of a steel housing similar to the housing 1 is indicated at 27 and the rim of a rigid nose piece or other housing section 28 constructed of rigid plastic or similar material having the required sound transmitting characteristics is provided with an annular tongue 29 fitted into a slot 30 similar to the slot 13 in the modification of Fig. 1. The nose piece 28 is secured against removal from the housing 27 by a ring or band 31 extending around the housing and having projections 32 and 33 engaging outwardly opening annular grooves 34 and 35 in the wall member 28 and the rim 27, respectively. The band 31 is preferably a split ring which may be expanded sufficiently to place it over the housing members when they are being assembled so that the members may be placed together with the tongue 29 in the slot 30 and the ring thereafter securely held in position with its projections 32 and 33 engaging the slots 34 and 35, a plurality of screws 36 being provided to secure the band 31 to the rim of the housing 27. The arrangement for effecting a seal between the end of the tongue 29 and the walls of the recess 30 is essentially the same as that shown in Figs. 2 and 3 and comprises a deformable annular gasket 37, a rigid pressure distributing ring 38, a plurality of wedge elements 39, and a plurality of screws 40. The construction of the pressure distributing ring, wedge elements, and screws may be the same as that shown in Figs. 2 and 3 and the seal is effected in the same manner by tightening the screws 40 to force the wedge elements 39 inwardly and compress the gasket 37. The projections 32 and 33 on the band 31 acts as stops to prevent withdrawal of the tongue 29 from the recess 30 and hold the tongue 29 rigidly in place so that the gasket 37, when compressed between the tongue and the pressure distributing member 38, provides a liquid-tight seal between rim 27 and rim 28. This arrangement illustrated provides minimum disturbance of the smooth external surface of the housing and provides an effective seal.

While the invention has been described in connection with a particular type of housing comprising a rigid metallic portion and a nose portion of either resilient or rigid sound transmitting material, other applications will readily be apparent to those skilled in the art. It is not, therefore, desired that the invention be limited to the specific constructions illustrated and described and it is intended by the appended claims to cover all modifications within the spirit and scope of the invention.

What I claim as new and desire to secure by Letters Patent of the United States, is:

1. In a fluid-tight enclosure, having separable wall sections, a seal for preventing leakage of fluid between the separable wall sections comprising a portion of one wall section having a slot extending around the opening between the sections, a portion of the other of said wall sections having a tongue extending around the opening between the sections and arranged to fit in said slot, means for preventing the withdrawal of said tongue from said slot, a gasket in said slot adjacent said tongue, wedge means in said slot between said gasket and the end of said slot, and pressure exerting means engaging said wedge means and accessible from outside said one wall section for forcing said gasket into sealing engagement with both said wall sections.

2. A seal for preventing leakage of fluid between two separable wall sections comprising a first wall section having a recess therein opening along one edge thereof, a second wall section having a portion entering said recess, means for preventing the withdrawal of said portion from said recess, a gasket extending across said recess and abutting the end of said portion, a rigid pressure element engaging said gasket on one side and spaced from the end of said recess on its other side, and means including a wedge lying against said other side of said element for moving said element to force said gasket into sealing engagement with both said wall sections.

3. A seal for preventing leakage of fluid between two separable wall sections comprising a first wall section having a slot therein near one edge thereof, a second wall section having a tongue extending into said slot, means for preventing the withdrawal of said tongue from said lot, a gasket extending across said recess and abutting the end of said tongue, a rigid pressure distributing element in said recess adjacent said gasket and having a sloping portion on its side remote from said gasket, and wedge means engaging said sloping portion for moving said pressure distributing element against said gasket to force said gasket into sealing engagement with both said wall members.

4. A seal for preventing leakage of fluid between two detachable casing sections comprising a rim portion on one of the sections having a slot therein extending therearound, the other of the sections having a tongue extending around the rim thereof and into said slot, means for preventing the withdrawal of said tongue from said slot, a gasket extending around said slot adjacent said tongue, a pressure distributing member extending around said one section within said slot, and means including a plurality of wedge members for forcing said pressure distributing member against said gasket to force said gasket into sealing engagement with both said sections.

5. A seal for preventing leakage of fluid between two detachable casing sections comprising a rim portion on one of the sections having a slot therein extending therearound, the other of the sections having a tongue extending around the rim thereof and into said slot, means for preventing the withdrawal of said tongue from said slot, a gasket extending around said slot adjacent said tongue, a pressure distributing member extending around said one section within said slot, a plurality of elongated elements of wedge-shaped cross section arranged in said slot adjacent said pressure distributing member, a plurality of screws detachably engaging said elements and extending from said slot outwardly through the wall of said one section for pressing said wedge members against said pressure member to force said gasket into sealing engagement with both said sections, a plurality of said screws engaging each of said elements and at least one of the plurality of screws engaging each element being keyed to the element to exert pressure in the opposite direction when said one screw is retracted.

6. A seal for preventing leakage of fluid between two detachable casing sections comprising a rim portion on one of the sections having a slot therein extending therearound, the other of the sections having a tongue extending around the rim thereof and into said slot, means for preventing the withdrawal of said tongue from said slot, a gasket extending around said slot adjacent said tongue, a pressure distributing member extending around said one section within said slot, a plu-rality of elongated elements of wedge-shaped cross section arranged in said slot adjacent said pressure distributing member, a plurality of screws extending from the outside wall of said one section into said slot adjacent respective ones of said wedge elements each of said screws having a portion detachably keyed to its respective one of said elements whereby each screw may exert pressure on its respective element in both directions of movement of the screw and said elements are detached from said screw simultaneously with the removal of the elements from said slot.

7. A seal for preventing leakage of fluid between two detachable casing sections comprising a rim portion on one of the sections having a slot therein extending therearound, the other of the sections having a tongue extending around the rim thereof and into said slot, a stop on said other wall section arranged to engage said one section for limiting the movement of said tongue in said slot, a plurality of screws extending from the outer wall of said one section into said slot for forcing said tongue into said slot to draw said stop into engagement with said one section and for preventing withdrawal of said tongue from said slot, a gasket extending around said slot adjacent said tongue, a pressure distributing member extending around said one section within said slot, a plurality of elongated elements of wedge-shaped cross section arranged in said slot adjacent said pressure distributing member, a plurality of screws extending from the outside wall of said one section into said slot adjacent respective ones of said wedge elements each of said screws having a portion detachably keyed to its respective one of said elements whereby each screw may exert pressure on its respective element in both directions of movement of the screw and said elements are detached from said screw simultaneously with the removal of the elements from said slot.

8. In a fluid-tight casing having two separable wall sections of round cross section, a seal for preventing leakage of fluid between said wall sections comprising respective portions of said wall sections arranged in abutting relationship about the round opening therebetween, one of said portions having a slot therein extending around the opening and opening toward the other of said portions, said other portion having a tongue extending into said slot, both of said portions having outwardly opening recesses therein near the edge of said opening, means including a band encircling said casing and overlapping said portions and having projections extending into said recesses for preventing removal of said tongue from said slot, a gasket in said slot adjacent said tongue, wedge means in said slot between said gasket and the end of said slot, and pressure exerting means engaging said wedge means and accessible from outside said one wall section for forcing said gasket into sealing engagement with both said wall sections.

JOHN SKOPIC.

REFERENCES CITED

The following references are of record in the file of this patent:

UNITED STATES PATENTS

| Number | Name | Date |
|---|---|---|
| 1,235,797 | Haskell | Aug. 7, 1917 |

FOREIGN PATENTS

| Number | Country | Date |
|---|---|---|
| 328,115 | Italy | July 1935 |